United States Patent
Chien et al.

(10) Patent No.: US 10,377,869 B2
(45) Date of Patent: Aug. 13, 2019

(54) PRECURSOR BLEND FOR PREPARING A THERMOPLASTIC POLYMER FOR A FIBER-REINFORCED COMPOSITE MATERIAL AND METHOD FOR PREPARING THE FIBER-REINFORCED COMPOSITE MATERIAL

(71) Applicant: Swancor Industrial Co., Ltd., Nan-Tou (TW)

(72) Inventors: Chen-Han Chien, Nan-Tou (TW); Yu-Tsan Tseng, Nan-Tou (TW); Kok-Sheng Tan, Nan-Tou (TW)

(73) Assignee: SWANCOR INDUSTRIAL CO., LTD., Nantou County (TW)

( * ) Notice: Subject to any disclaimer, the term of this patent is extended or adjusted under 35 U.S.C. 154(b) by 322 days.

(21) Appl. No.: 14/990,969

(22) Filed: Jan. 8, 2016

(65) Prior Publication Data

US 2017/0137587 A1    May 18, 2017

(30) Foreign Application Priority Data

Nov. 13, 2015  (TW) .............................. 104137428 A

(51) Int. Cl.
| | |
|---|---|
| *C08J 5/24* | (2006.01) |
| *C08G 59/50* | (2006.01) |
| *C08G 59/24* | (2006.01) |
| *C08J 5/04* | (2006.01) |
| *C08G 59/38* | (2006.01) |

(52) U.S. Cl.
CPC .............. *C08J 5/24* (2013.01); *C08G 59/245* (2013.01); *C08G 59/5026* (2013.01); *C08G 59/5033* (2013.01); *C08J 5/042* (2013.01); *C08G 59/38* (2013.01); *C08J 2363/00* (2013.01); *C08J 2363/02* (2013.01)

(58) Field of Classification Search
None
See application file for complete search history.

(56) References Cited

U.S. PATENT DOCUMENTS

| | | | | | |
|---|---|---|---|---|---|
| 2,633,458 | A | * | 3/1953 | Shokal | ............... C08G 59/1416 264/164 |
| 3,409,592 | A | * | 11/1968 | Landua | .................. C08G 59/50 523/454 |
| 6,011,111 | A | | 1/2000 | Brennan et al. | |
| 2008/0269420 | A1 | * | 10/2008 | Tong | ..................... B29C 61/003 525/208 |
| 2009/0202809 | A1 | * | 8/2009 | Cawse | ................. C08G 59/184 428/295.1 |

FOREIGN PATENT DOCUMENTS

| | | | |
|---|---|---|---|
| JP | 2001323048 A | * | 11/2001 |
| KR | 920010141 | | 11/1992 |
| KR | 940010827 | | 11/1994 |
| TW | 396192 | | 7/2000 |
| TW | 201500397 | | 1/2015 |

OTHER PUBLICATIONS

"Office Action of Taiwan Counterpart Application," dated Jun. 26, 2017, p. 1-p. 3, in which the listed references were cited.
"Office Action of Korean Counterpart Application," dated Apr. 27, 2017, with English translation thereof, p. 1-p. 15, in which the listed references were cited.

* cited by examiner

*Primary Examiner* — Randy P Gulakowski
*Assistant Examiner* — Ha S Nguyen
(74) *Attorney, Agent, or Firm* — JCIPRNET

(57) ABSTRACT

A precursor blend for preparing a thermoplastic polymer for a fiber-reinforced composite material includes a major amount of a stoichiometric mixture of a diepoxide, and an amine compound selected from the group consisting of monofunctional primary amine and difunctional secondary amine, and a minor amount of a modifier selected from the group consisting of difunctional primary amine, trifunctional primary amine, triepoxide, tetraepoxide, and combinations thereof.

5 Claims, No Drawings

PRECURSOR BLEND FOR PREPARING A THERMOPLASTIC POLYMER FOR A FIBER-REINFORCED COMPOSITE MATERIAL AND METHOD FOR PREPARING THE FIBER-REINFORCED COMPOSITE MATERIAL

CROSS-REFERENCE TO RELATED APPLICATIONS

This application claims priority of Taiwanese Application No. 104137428, filed on Nov. 13, 2015. The contents of this prior application are hereby incorporated by reference herein in its entirety.

FIELD

The disclosure relates to a precursor blend, and more particularly to a precursor blend for preparing a thermoplastic polymer for a fiber-reinforced composite material. The disclosure also relates to the fiber-reinforced composite material and a method for preparing the fiber-reinforced composite material.

BACKGROUND

A composite material is a material made from two or more constituent materials with significantly different physical or chemical properties. In recent years, the composite materials have been widely used in textiles, buildings, car bodies, electronic parts, and the like. Such composite materials are usually composited of a fibrous matrix and a reinforcing agent distributed on the fibrous matrix. The reinforcing agent is used for enhancing various performances of the fibrous matrix, such as tensile strength, flexural strength, and the like.

Thermoplastic polymer is commonly used as the reinforcing agent for the fibrous matrix to enhance mechanical properties, such as tensile strength, elongation and flexural strength, of the fibrous matrix. Conventional thermoplastic polymers used as the reinforcing agent are produced by subjecting a diepoxide compound (i.e., a compound having two epoxide functionalities) and a mono primary amine compound or bis(secondary amine) compound to polymerization.

For example, U.S. Pat. No. 6,011,111 discloses a process for making a thermoplastic composite which comprises reacting in-situ a low viscosity mixture of a dieposide with a difunctional species in the presence of reinforcing fibers.

However, the thermoplastic polymer thus produced has a linear configuration, and the composite material made from the thermoplastic polymer and fibers may not have satisfactory mechanical properties and a sufficiently high glass transition temperature.

In addition, composite materials are conventionally made by embedding fibers into a thermoplastic polymer which is synthesized in advance. For example, the thermoplastic polymer synthesized in advance is hot-molten and the fibers are then embedded into the hot-molten thermoplastic polymer to produce the composite material. Since the thermoplastic polymer has relatively high viscosity, the effect of embedding the fibers into the thermoplastic polymer is unsatisfactory, and the interlayer bonding of the composite material is inferior.

There is a need in the art to provide a composite material which may overcome the aforesaid disadvantages of the prior art.

SUMMARY

Therefore, a first object of the disclosure is to provide a precursor blend for preparing a thermoplastic polymer for a fiber-reinforced composite material such that the fiber-reinforced composite material has a relatively high glass transition temperature and improved mechanical properties in terms of tensile strength, elongation, and flexural strength, and which is thermoformable.

A second object of this disclosure is to provide the fiber-reinforced composite material.

A third object of this disclosure is to provide a method for preparing the fiber-reinforced composite material.

According to the first aspect of this disclosure, there is provided a precursor blend for preparing a thermoplastic polymer for a fiber-reinforced composite material. The precursor blend includes a major amount of a stoichiometric mixture of a diepoxide and an amine compound selected from the group consisting of monofunctional primary amine and difunctional secondary amine, and a minor amount of a modifier selected from the group consisting of difunctional primary amine, trifunctional primary amine, triepoxide, tetraepoxide, and combinations thereof.

According to the second aspect of this disclosure, there is provided a fiber reinforced composite material including a fibrous matrix, and a thermoplastic polymer obtained by in-situ polymerization of the precursor blend described above. The thermoplastic polymer embeds the fibrous matrix.

According to the third aspect of this disclosure, there is provided a method for preparing a fiber-reinforced composite material which comprises the steps of: applying the precursor blend described above onto a fibrous matrix, and subjecting the precursor blend to in-situ polymerization to form a thermoplastic polymer.

DETAILED DESCRIPTION

A precursor blend according to the disclosure is used for preparing a thermoplastic polymer for a fiber-reinforced composite material. The precursor blend includes a major amount of a stoichiometric mixture of a diepoxide and an amine compound selected from the group consisting of monofunctional primary amine and difunctional secondary amine, and a minor amount of a modifier selected from the group consisting of difunctional primary amine, trifunctional primary amine, triepoxide, tetraepoxide, and combinations thereof.

Amine Compound:

The amine compound is monofunctional primary amine or difunctional secondary amine. Preferably, the monofunctional primary amine is represented by R1-NH2, and the difunctional secondary amine is represented by R2-NH-Z1-NH-R3 or

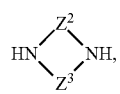

wherein
each of R1, R2, and R3 is independently substituted or unsubstituted C1-C30 alkyl, substituted or unsubstituted C2-C30 alkenyl, or substituted or unsubstituted C6-C30 aryl, Z1 is a divalent linking group, and each of Z2 and Z3 is independently substituted or unsubstituted C1-C5 alkylene.

Preferably, each of R1, R2, and R3 is independently substituted or unsubstituted C1-C10 alkyl, or substituted or unsubstituted C6-C14 aryl. More preferably, each of R1, R2, and R3 is independently C1-C10 linear or branched alkyl, C3-C10 cycloalkyl, C7-C11 aralkyl, or C6-C14 aryl. Most preferably, each of R1, R2, and R3 is independently benzyl, cyclohexyl, phenyl, n-butyl, or sec-butyl.

Preferably, Z1 is substituted or unsubstituted C1-C30 alkylene, substituted or unsubstituted C6-C30 arylene, or a divalent linking group formed by combining at least two independently selected from the group consisting of substituted or unsubstituted C1-C30 alkylene, and substituted or unsubstituted C6-C30 arylene. More preferably, Z1 is a

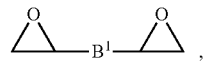

wherein B1 is a divalent linking group.

Preferably, B1 is substituted or unsubstituted C1-C30 alkylene, substituted or unsubstituted C6-C30 arylene, or a divalent linking group formed by combining at least two independently selected from the group consisting of substituted or unsubstituted C1-C30 alkylene, substituted or unsubstituted C6-C30 arylene, and —O—.

More preferably, B1 is represented by —CH2—O—Z4—O—CH2—, wherein Z4 is substituted or unsubstituted C1-C30 alkylene (preferably, ethylene), substituted or

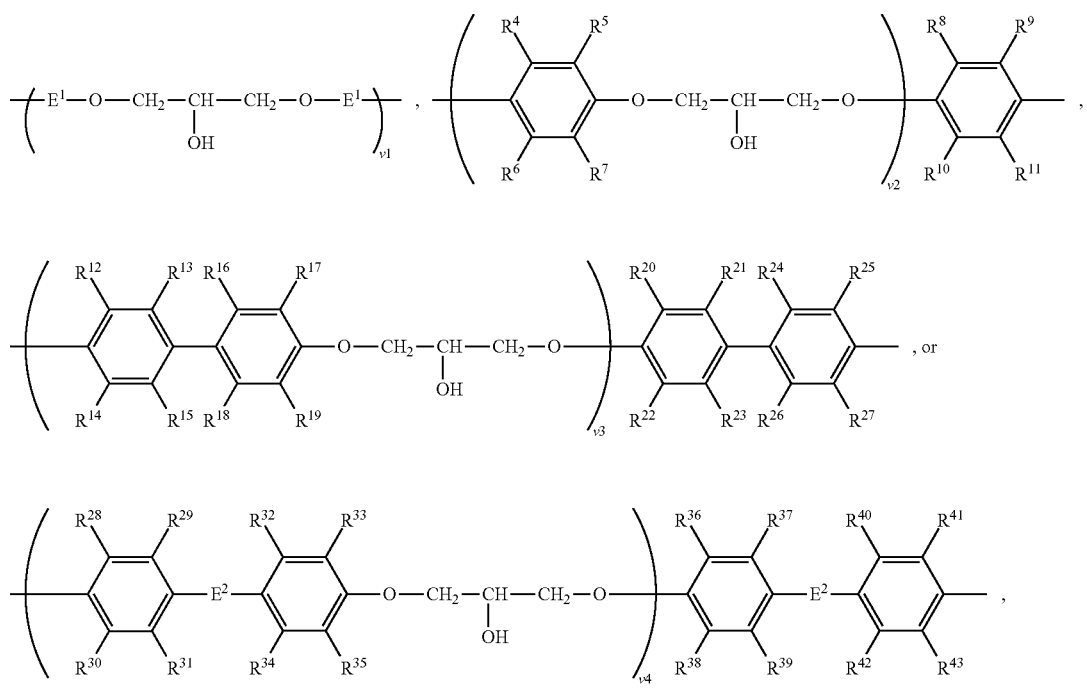

divalent linking group formed by combining at least two independently selected from the group consisting of substituted or unsubstituted C1-C8 alkylene, and substituted or unsubstituted C6-C20 arylene. Most preferably, Z1 is

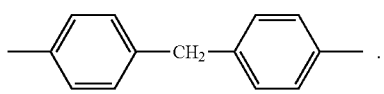

Preferably, each of Z2 and Z3 is independently substituted or unsubstituted C1-C3 alkylene. More preferably, each of Z2 and Z3 is ethylene.

Examples of the amine compound include, but are not limited to, cyclohexylamine, benzylamine, n-butylamine, aniline, N,N'-di-sec-butyl-4,4'-methylenedianiline, and piperazine. The amine compound used in the illustrated examples includes aniline and piperazine.

Diepoxide:

Dieposide is an epoxy resin having two epoxide functionalities, and is preferably represented by unsubstituted C6-C30 arylene (preferably, phenylene), wherein each of E1 and E2 is independently C1-C30 alkylene, and preferably C1-C12 alkylene, each of R4 to R43 is independently H, C1-C10 alkyl, or halo, each of v1, v2, and v3 is a value ranging from 0 to 50, and preferably from 0 to 20, and v4 is a value ranging from 0 to 20, and preferably from 0 to 10.

The diepoxide used in the illustrated examples is a compound represented by

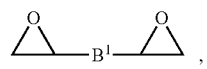

wherein B1 is —CH2—O—Z4—O—CH2—, wherein Z4 is

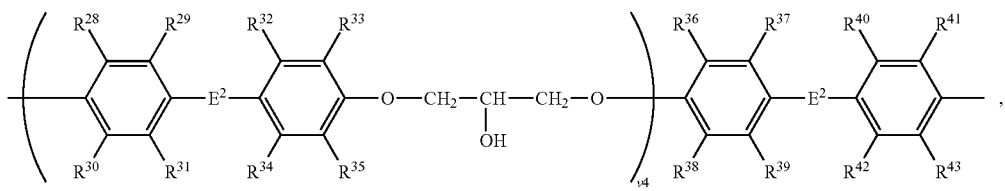

wherein E2 is unsubstituted or methyl-substituted methylene, each of R28-R43 is H, and v4 is a value ranging from 1 to 3.

Examples of diepoxide include, but are not limited to, resorcinol diglycidyl ether, ethylene glycol diglycidyl ether, bisphenol A diglycidyl ether, and bisphenol F diglycidyl ether. Diepoxide used in the illustrated examples includes bisphenol A diglycidyl ether and bisphenol F diglycidyl ether.

The epoxide equivalent weight of diepxide ranges preferably from 50 to 2,000, and more preferably from 150 to 1,000.

Difunctional Primary Amine:

Difunctional primary amine is preferably represented by NH2—Y3—NH2, is wherein Y3 is a divalent linking group.

Preferably, Y3 is substituted or unsubstituted C1-C30 alkylene, substituted or unsubstituted C6-C30 arylene, or a divalent linking group formed by combining at least two independently selected from the group consisting of substituted or unsubstituted C1-C30 alkylene, substituted or unsubstituted C6-C30 arylene, and —NH—.

More preferably, Y3 is substituted or unsubstituted C1-C8 alkylene, or a divalent linking group formed by combining at least two independently selected from the group consisting of substituted or unsubstituted C1-C8 alkylene, substituted or unsubstituted C6-C20 arylene, and —NH—.

Most preferably, Y3 is

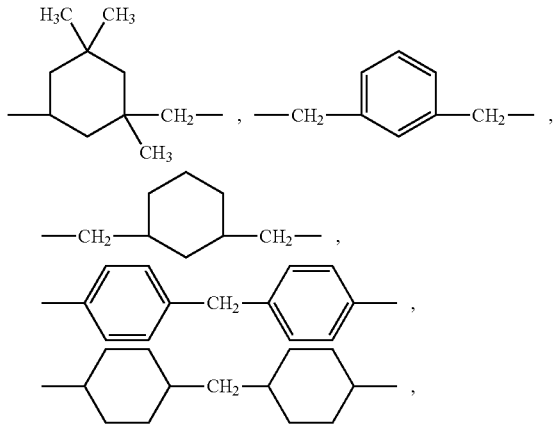

—(CH2)2—NH—(CH2)2—, —(CH2)2—NH—(CH2)2—NH—(CH2)2—, or —(CH2)2—NH—(CH2)2—NH—(CH2)2—NH—(CH2)2—.

The difunctional primary amine used in the illustrated examples is a compound represented by NH2—Y3—NH2, wherein Y3 is

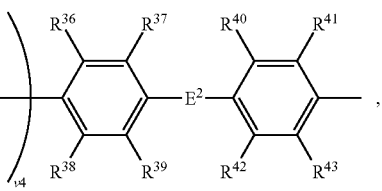

Examples of the difunctional primary amine include, but are not limited to, 4,4'-diaminodicyclohexylmethane, isophoronediamine, 1,3-bis(aminomethyl)cyclohexane, 4,4'-methylenedianiline, diethylenetriamine, triethylenetetramine, and tetraethylenepentamine. The difunctional primary amine used in the illustrated examples is 4,4'-diaminodicyclohexylmethane.

Trifunctional Primary Amine:

Trifunctional primary amine is preferably represented by

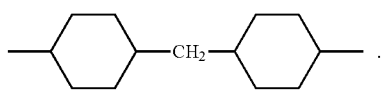

wherein Y4 is a trivalent linking group.

Preferably, Y4 is represented by:

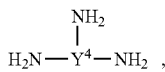

wherein each of E20, E21, and E22 is independently substituted or unsubstituted C1-C30 alkylene, substituted or unsubstituted C6-C30 arylene, or a divalent linking group formed by combining at least two independently selected from the group consisting of substituted or unsubstituted C1-C30 alkylene, substituted or unsubstituted C6-C30 arylene, and —O—, and R45 is H, C1-C10 alkyl, or hydroxyl.

More preferably, each of E20, E21, and E22 is independently substituted or unsubstituted C6-C20 arylene, or a divalent linking group formed by combining at least two independently selected from the group consisting of substituted or unsubstituted C1-C30 alkylene, and —O—.

Most preferably, Y4 is

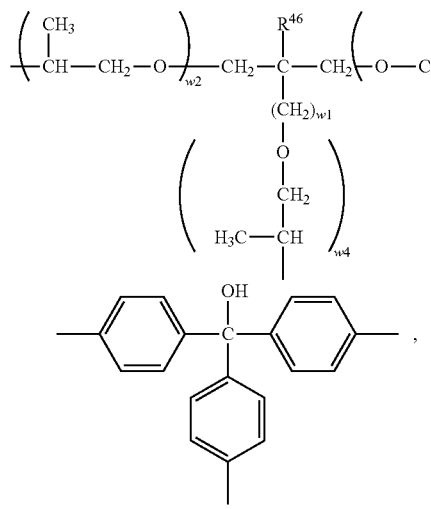

wherein
R46 is H or C1-C10 alkyl,
w1 is 0 or 1, and
sum of w2, w3, and w4 is 5 or 6.

The trifunctional primary amine used in the illustrated examples is a compound is represented by

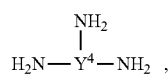

wherein Y4 is

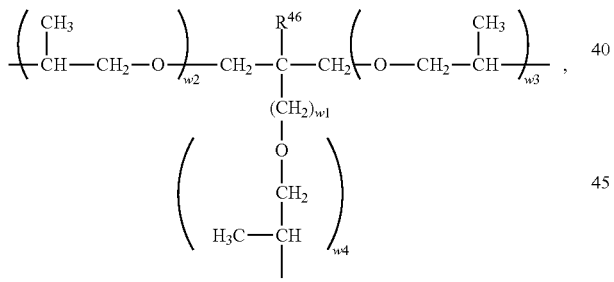

wherein R46 is ethyl, w1 is 1, and sum of w2, w3, and w4 is 5 or 5.

Examples of the trifunctional primary amine include, but are not limited to, polyetheramine (Huntsman T-403) and pararosaniline base. The trifunctional primary amine used in the illustrated examples is polyetheramine (Huntsman T-403).

Triepoxide:

Triepoxide is an epoxy resin represented by

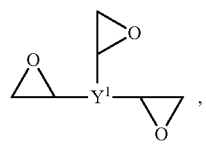

wherein Y1 is a trivalent linking group.

Preferably, Y1 is represented by:

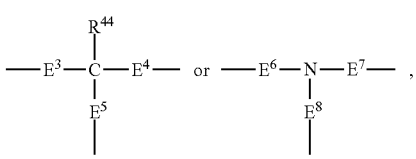

wherein each of E3, E4, E5, E6, E7, and E8 is independently substituted or unsubstituted C1-C30 alkylene, substituted or unsubstituted C6-C30 arylene, or a divalent linking group formed by combining at least two independently selected from the group consisting of substituted or unsubstituted C1-C30 alkylene, substituted or unsubstituted C6-C30 arylene, and —O—, and R44 is C1-C10 alkyl or H.

More preferably, each of E3, E4, E5, E6, E7, and E8 is independently substituted or unsubstituted C1-C8 alkylene, or a divalent linking group formed by combining at least two independently selected from the group consisting of substituted or unsubstituted C1-C8 alkylene, substituted or unsubstituted C6-C20 arylene, and —O—, and R44 is methyl, ethyl or H.

Most preferably, Y1 is

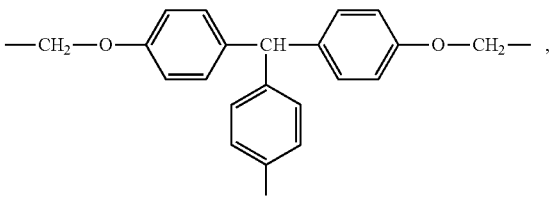

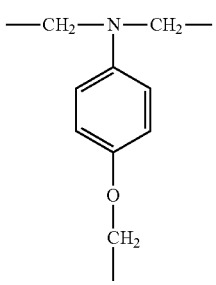

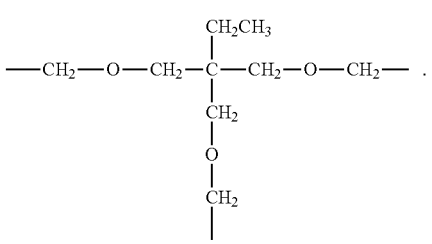

The triepoxide used in the illustrated examples is a compound represented by

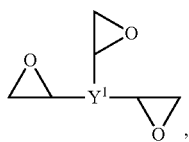

wherein Y1 is

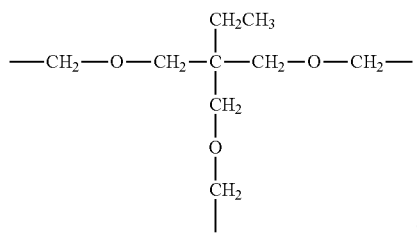

Examples of triepoxide include, but are not limited to, 2,2',2"-[methylidynetris(p-phenyleneoxymethylene)]trioxirane, N,N-diglycidyl-4-glycidyloxyaniline, and trimethylolpropane triglycidyl ether. The triepoxide used in the illustrated examples is trimethylolpropane triglycidyl ether.

Tetraepoxide:

Tetraepoxide is an epoxy resin represented by

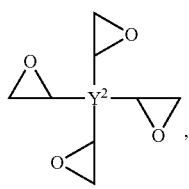

wherein Y2 is a tetravalent linking group.

Preferably, Y2 is represented by:

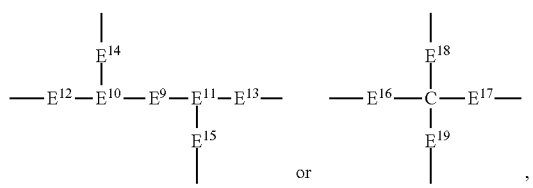

wherein

E9 is a single bond, substituted or unsubstituted C1-C30 alkylene, substituted or unsubstituted C6-C30 arylene, or a divalent linking group formed by combining at least two independently selected from the group consisting of substituted or unsubstituted C1-C30 alkylene, substituted or unsubstituted C6-C30 arylene, and —O—, each of E10 and E11 is independently N or CH, each of E12, E13, E14, E15, E16, E17, E18, and E19 is independently substituted or unsubstituted C1-C30 alkylene, substituted or unsubstituted C6-C30 arylene, or a divalent linking group formed by combining at least two independently selected from the group consisting of substituted or unsubstituted C1-C30 alkylene, substituted or unsubstituted C6-C30 arylene, and More preferably, E9 is a single bond, or a divalent linking group formed by combining at least two independently selected from the group consisting of substituted or unsubstituted C1-C8 alkylene, substituted or unsubstituted C6-C20 arylene, and —O—, and each of E12, E13, E14, E15, E16, E17, E18, and E19 is independently substituted or unsubstituted C1-C8 alkylene, or a divalent linking group formed by combining at least two independently selected from the group consisting of substituted or unsubstituted C1-C8 alkylene, substituted or unsubstituted C6-C20 arylene, and —O—.

More preferably, Y2 is

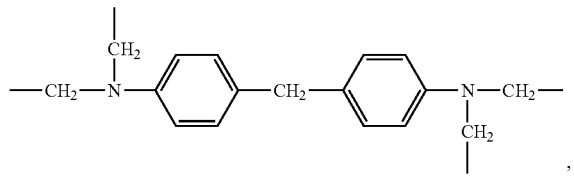

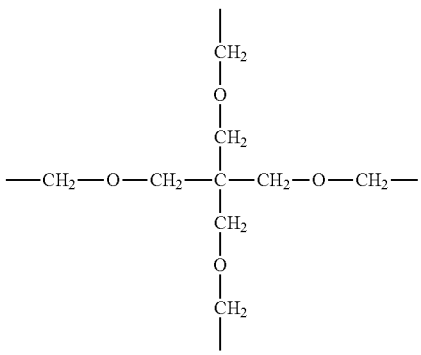

, or

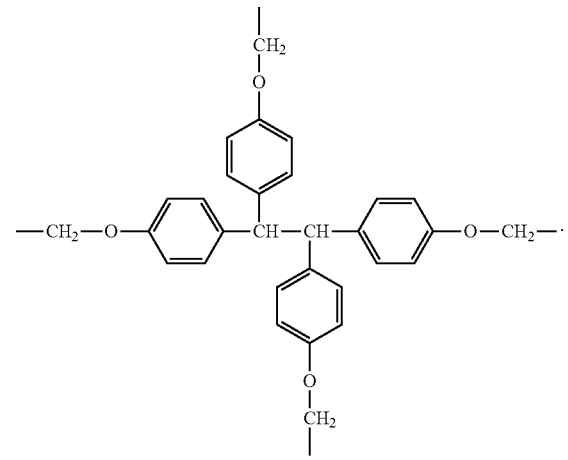

The tetraepoxide used in the illustrated examples is a compound represented by

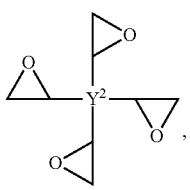

wherein Y2 is

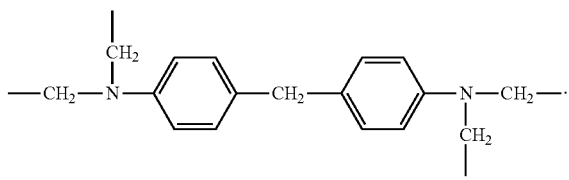 [SMILES: CCN(CC)c1ccc(Cc2ccc(N(CC)CC)cc2)cc1]

Examples of tetraepoxide include, but are not limited to, 4,4'-methylenebis(N,N-diglycidylaniline), tetraphenylolethane glycidyl ether, and pentaerythritol glycidyl ether. The tetraepoxide used in the illustrated examples is 4,4'-methylenebis(N,N-diglycidyl aniline).

When the precursor blend including difunctional primary amine, trifunctional primary amine, triepoxide, and/or tetraepoxide as the modifier is used for preparing a thermoplastic polymer, the thermoplastic polymer thus formed has branched segments. A fiber-reinforced composite material formed by the thermoplastic polymer and a fibrous matrix has a relatively high glass transition temperature and improved mechanical properties in terms of tensile strength, elongation, and flexural strength, while maintaining thermoplasticity (i.e., thermoformability).

In addition, a crystallization adjutant may be used as the modifier for preparing a thermoplastic polymer, the thermoplastic polymer thus formed has enhanced crystallinity. A fiber-reinforced composite material formed by the thermoplastic polymer and a fibrous matrix has a relatively high glass transition temperature and improved mechanical properties in terms of tensile strength, elongation, and flexural strength, while maintaining thermoplasticity.

A non-limiting example of the crystallization adjutant is Jeffamine M-1000. In addition, a thermoplastic oligomer may be used as the modifier is used for preparing a thermoplastic polymer, the thermoplastic polymer thus formed has enhanced molecular weight. A fiber-reinforced composite material formed by the thermoplastic polymer and a fibrous matrix has improved mechanical properties in terms of tensile strength, elongation, and flexural strength, while maintaining thermoplasticity.

Preferably, the thermoplastic oligomer useful as the modifier has a weight average molecular weight larger than 20,000.

A method for preparing a fiber-reinforced composite material according to the disclosure includes the steps of: applying the precursor blend described above onto a fibrous matrix, and subjecting the precursor blend to in-situ polymerization to form a thermoplastic polymer.

When the precursor blend is obtained by simultaneously mixing the diepoxide, the amine compound, and the modifier selected from the group consisting of the difunctional primary amine, the trifunctional primary amine, the triepoxide, the tetraepoxide, and combinations thereof, the thermoplastic polymer thus formed has a hyper-branched structure. Specifically, when the difunctional primary amine or the trifunctional primary amine is used as the modifier in the precursor blend, the diepoxide is subjected to a modified reaction with the amine compound and the modifier. When the triepoxide or the tetraepoxide is used as the modifier in the precursor blend, the amine compound is subjected to a modified reaction with the diepoxide and the modifier.

Preferably, the precursor blend is obtained by simultaneously mixing the diepoxide, the amine compound, and the modifier selected from the group consisting of the difunctional primary amine, the trifunctional primary amine, the triepoxide, the tetraepoxide, and combinations thereof at a temperature ranging from 20° C. to 150° C.

When the difunctional primary amine or the trifunctional primary amine is used as the modifier, the precursor blend is obtained by mixing the diepoxide with the modifier, followed by mixing with the amine compound. When the triepoxide or the tetraepoxide is used as the modifier, the precursor blend is obtained by mixing the amine compound with the modifier followed by mixing with the diepoxide. When the precursor blend is obtained in the above manners, the thermoplastic polymer thus formed has a star-branched structure.

Specifically, when the difunctional primary amine or the trifunctional primary amine is used as the modifier, the precursor blend is obtained by mixing the diepoxide with the modifier at a temperature ranging from 20° C. to 150° C. for a period ranging from 0.5 hour to 5 hours to perform a modified reaction, followed by mixing with the amine compound at a temperature ranging from 20° C. to 150° C. When the triepoxide or the tetraepoxide is used as the modifier, the precursor blend obtained by mixing the amine compound with the modifier at a temperature ranging from 20° C. to 150° C. for a period ranging from 0.5 hour to 5 hours to perform a modified reaction, followed by mixing with the diepoxide at a temperature ranging from 20° C. to 150° C.

Preferably, after applying the precursor blend onto the fibrous matrix, the precursor blend applied to the fibrous matrix is evenly pressed with a roller at a temperature ranging from 20° C. to 150° C. prior to the in-situ polymerization.

The in-situ polymerization is conducted at a temperature gradually increasing from 20° C. to 150° C.

A fiber reinforced composite material prepared by the aforesaid method includes a fibrous matrix, and a thermoplastic polymer obtained by in-situ polymerization of the precursor blend at the fibrous matrix and embedding the fibrous matrix.

The thermoplastic polymer is represented by Formula I,

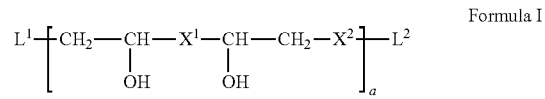

Formula I wherein

X1 is selected from the group consisting of B1, Formula II, and Formula III,

Formula II

-continued

Formula III

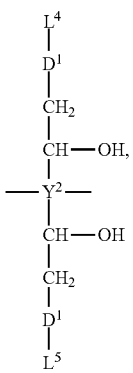

X2 is selected from the group consisting of D1, Formula IV, and Formula V with the proviso that X2 is not D1 when X1 is B1, Formula IV Formula V

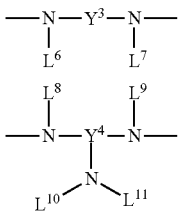

L1 is represented by Formula VI:

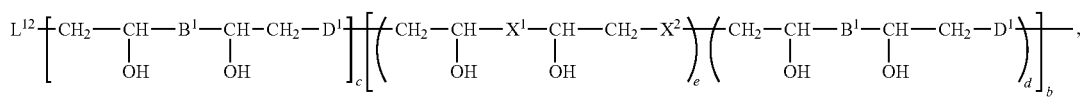

Formula VI

L2 is represented by Formula VII:

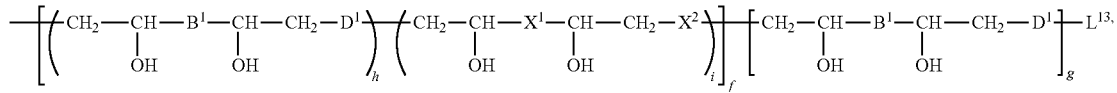

Formula VII a is from 0.01 to 0.5,
in Formulas II-VII,
Y1 and Y4 are independently a trivalent linking group,
Y2 is a tetravalent linking group,
B1 a bivalent linking group other than Formulae II, III, IV, and V,
Y3 is a bivalent linking group other than Formulae II, III, and V,

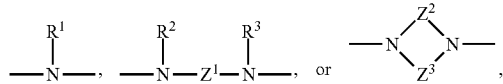

D1 is
wherein
R1, R2, and R3 are independently substituted or unsubstituted C1-C30 alkyl, substituted or unsubstituted C2-C30 alkenyl, or substituted or unsubstituted C6-C30 aryl,
Z1 is a divalent linking group other than Formulae II, III, IV, and V, and
Z2 and Z3 are independently an substituted or unsubstituted C1-C5 alkyl,
b, c, d, f, g, and h are independently from 0 to 0.99,
e and i are independently from 0 to 0.5;

L3 is represented by Formula VIII:
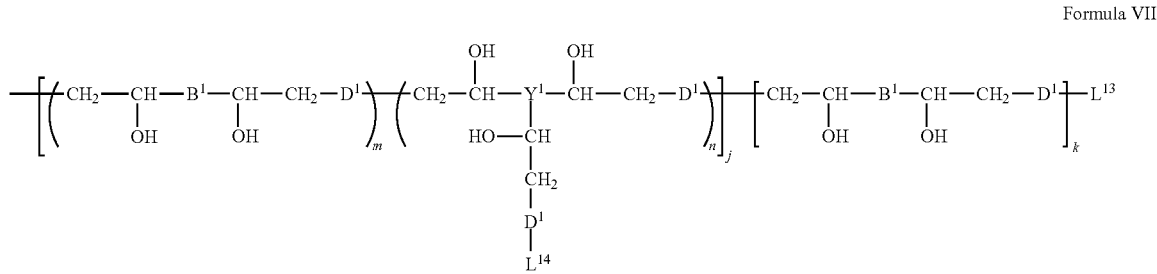
Formula VIII
L4 and L5 are independently represented by Formula IX:
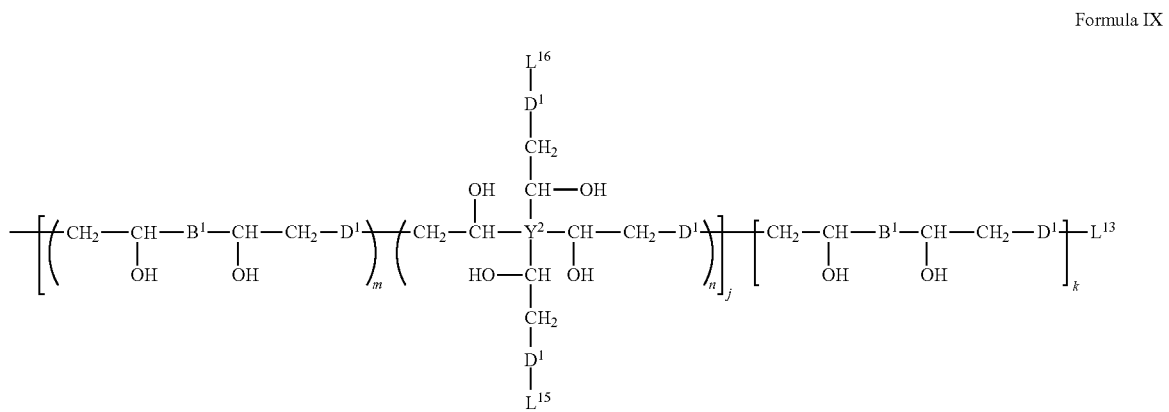
Formula IX
L6 and L7 are independently represented by Formula X:
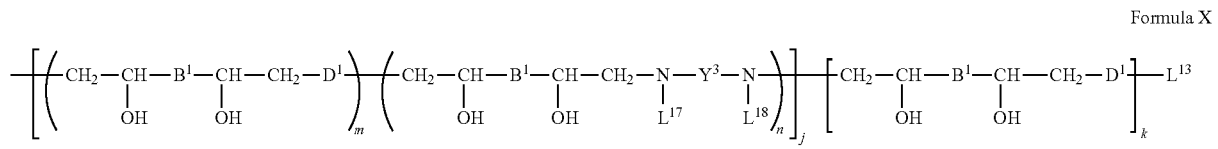
Formula X
L8, L9, L10, and L11 are independently represented by Formula XI:
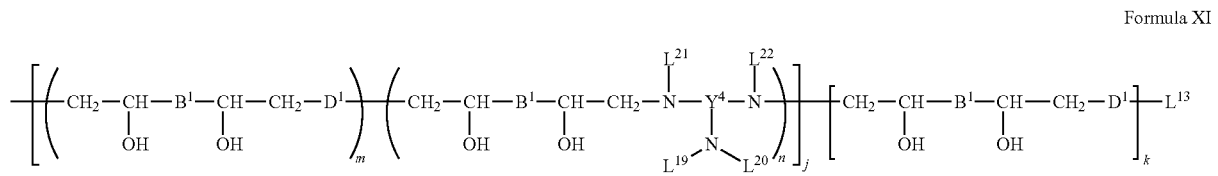
Formula XI
L12 is H-D1 or
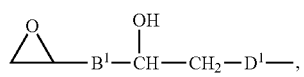
L13 is H or
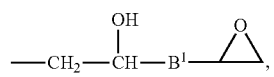

in Formulae VIII-XI,
L14 is represented by Formula XII:
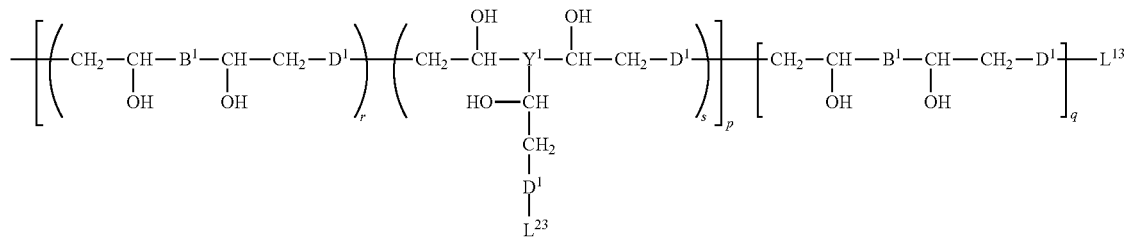
Formula XII
L15 and L16 are independently represented by Formula XIII:
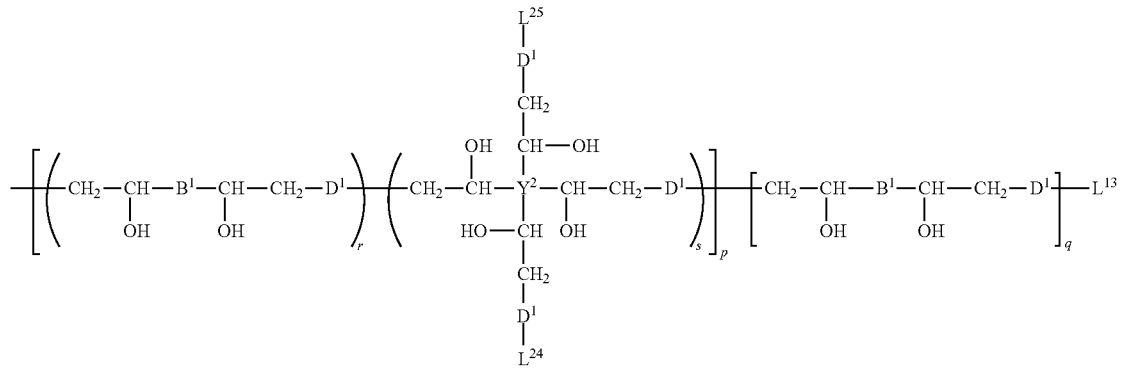
Formula XIII
L17 and L18 are independently represented by Formula XIV:
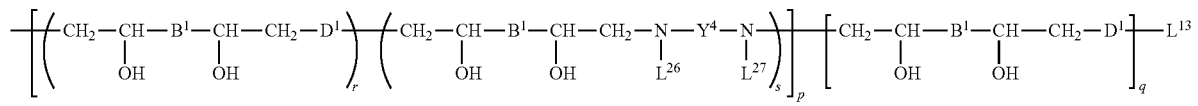
Formula XIV
L19, L20, L21, and L22 are independently represented by Formula XV:
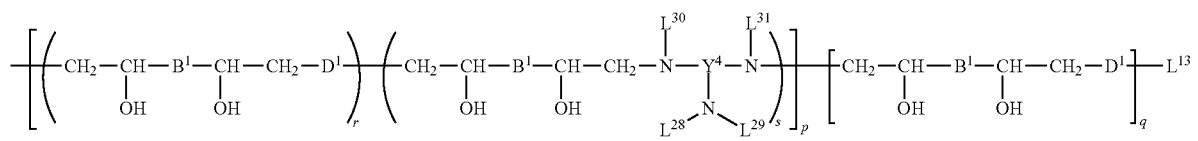
Formula XV j, k, m, and n are independently from 0 to 0.5,
in Formulae XII-XV,
p, q, r, and s are independently from 0 to 0.5,
L23, L24, L25, L26, L27, L28, L29, L30, and L31 are independently represented by Formula XVI:

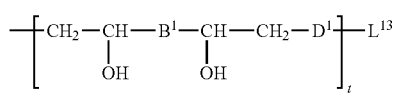

Formula XVI t is from 0 to 0.5, and
a+b+c+g+f=1.

Preferably, b, f, j, and p are 0.

Preferably, b, f, j, and p are not 0 at the same time, and e, i, n, and s are not 0. When b, f, j, and p in Formula I are 0, the thermoplastic polymer has a star-branched structure. When b, f, j, and p are not 0 at the same time, and e, i, n, and s are not 0 in Formula I, the thermoplastic polymer has a hyper-branched structure.

Preferably, B1 is substituted or unsubstituted C1-C30 alkylene, substituted or unsubstituted C6-C30 arylene, or a divalent linking group formed by combining at least two independently selected from the group consisting of substituted or unsubstituted C1-C30 alkylene, substituted or unsubstituted C6-C30 arylene, and —O—.

Preferably, B1 is represented by —CH2—O—Z4—O—CH2—, wherein Z4 is substituted or unsubstituted C1-C30 alkylene, substituted or unsubstituted C6-C30 arylene, Preferably, Z1 is substituted or unsubstituted C1-C30 alkylene, substituted or unsubstituted C6-C30 arylene, or a divalent linking group formed by combining at least two independently selected from the group consisting of substituted or unsubstituted C1-C30 alkylene, and substituted or unsubstituted C6-C30 arylene.

Preferably, Y3 is substituted or unsubstituted C1-C30 alkylene, substituted or unsubstituted C6-C30 arylene, or a divalent linking group formed by combining at least two independently selected from the group consisting of substituted or unsubstituted C1-C30 alkylene, substituted or unsubstituted C6-C30 arylene, and —NH—.

More preferably, Y3 is

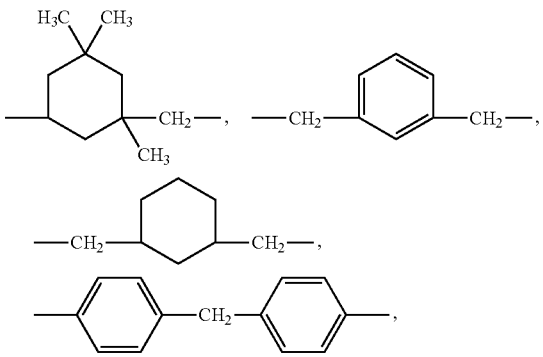

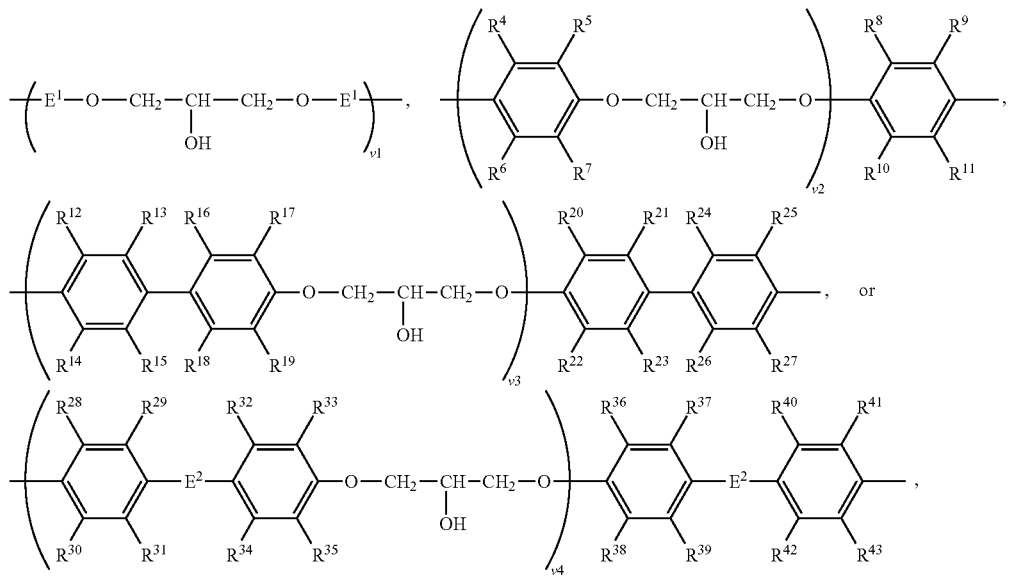

wherein
each of E1 and E2 is independently C1-C30 alkylene,
each of R4 to R43 is independently H, C1-C10 alkyl, or halo,
each of v1, v2, and v3 is a value ranging from 0 to 50, and
v4 is a value ranging from 0 to 20.

Preferably, Y1 is represented by Formula XVII or Formula XVIII described above.

Preferably, Y2 is represented by Formula XIX or Formula XX described above.

-continued

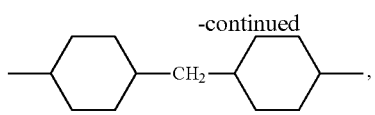

(CH2)2—NH—(CH2)2—, —(CH2)2—NH—(CH2)2—NH—(CH2)2—, or —(CH2)2—NH—(CH2)2—NH—(CH2)2—NH—(CH2)2—.

Preferably, Y4 is represented by Formula XXI described above.

The thermoplastic polymer obtained by in-situ polymerization of the precursor blend has a weight average molecular weight preferably from 10,000 to 100,000, more preferably from 20,000 to 40,000, and most preferably from 24,000 to 35,000.

Preferably, the fibrous matrix is formed by carbon fibers, glass fibers, aramid fibers (for example, Kevlar fibers), natural fibers, ceramic fibers, or combinations thereof. The fibrous matrix used in the illustrated examples is formed by carbon fibers.

Optionally, the additives commonly used in the art may be added into the fiber reinforced composite material. Examples of the additives include, but are not limited to, defoaming agents, dispersing agents, leveling agents, wetting agents, adhesion enhancers, abrasives, flame retardants, and coupling agents.

EXAMPLES

The following examples are provided to illustrate the embodiments of the disclosure, and should not be construed as limiting the scope of the disclosure.
Preparation of Fiber Reinforced Composite Material:

Example 1

(Modifier: Difunctional Primary Amine; Thermoplastic Polymer: Hyper-Branched)

Bisphenol A epoxy resin (100 g, epoxide equivalent weight: 176-184), benzylamine (28.71 g), and 4,4'-diaminodicyclohexylmethane (0.29 g, modifier) were homogeneously stirred at 30□ to obtain a precursor blend.

Thereafter, the precursor blend was evenly applied onto a 3K carbon fiber woven fabric in a hand lay-up process within 2 hours, and was then evenly pressed using a roller at 50□. The precursor blend was then subjected to in-situ polymerization at a step-wise increasing temperature (i.e., at 50□ for 1 hour followed by at 100□ for 1 hour, and then at is 150□ for 2 hours) to produce a branched thermoplastic polymer which embedded the 3K carbon fiber woven fabric, thereby obtaining a fiber reinforced composite material.

Example 2

(Modifier: Difunctional Primary Amine; Thermoplastic Polymer: Star-Branched)

Bisphenol A epoxy resin (100 g, epoxide equivalent weight: 176-184) and 4,4'-diaminodicyclohexylmethane (0.29 g, modifier) were homogeneously stirred for 4 hours at 60□, followed by addition of benzylamine (28.42 g) and homogeneous stirring at 30□ to obtain a precursor blend.

Thereafter, the precursor blend was evenly applied onto a 3K carbon fiber woven fabric in a hand lay-up process within 2 hours, and was then evenly pressed using a roller at 50□. The precursor blend was then subjected to in-situ polymerization at a step-wise increasing temperature (i.e., at 50□ for 1 hour followed by at 100□ for 1 hour, and then at 150□ for 2 hours) to produce a branched thermoplastic polymer which embedded the 3K carbon fiber woven fabric, thereby obtaining a fiber reinforced composite material.

Example 3

(Modifier: Trifunctional Primary Amine; Thermoplastic Polymer: Hyper-Branched)

Bisphenol A epoxy resin (100 g, epoxide equivalent weight: 176-184), benzylamine (28.71 g), and polyetheramine (Huntsman T-403, 0.29 g, modifier) were homogeneously stirred at 30□ to obtain a precursor blend.

Thereafter, the precursor blend was evenly applied onto a 3K carbon fiber woven fabric in a hand lay-up process within 2 hours, and was then evenly pressed using a roller at 50□. The precursor blend was then subjected to in-situ polymerization at a step-wise increasing temperature (i.e., at 50□ for 1 hour followed by at 100□ for 1 hour, and then at 150□ for 2 hours) to produce a branched thermoplastic polymer which embedded the 3K carbon fiber woven fabric, thereby obtaining a fiber reinforced composite material.

Example 4

(Modifier: Trifunctional Primary Amine; Thermoplastic Polymer: Star-Branched)

Bisphenol A epoxy resin (100 g, epoxide equivalent weight: 176-184) and polyetheramine (Huntsman T-403, 0.58 g, modifier) were homogeneously stirred for 4 hours at 60□, followed by addition of benzylamine (28.42 g) and homogeneous stirring at 30□ to obtain a precursor blend.

Thereafter, the precursor blend was evenly applied onto a 3K carbon fiber woven fabric in a hand lay-up process within 2 hours, and was then evenly pressed using a roller at 50□. The precursor blend was then subjected to in-situ polymerization at a step-wise increasing temperature (i.e., at 50□ for 1 hour followed by at 100□ for 1 hour, and then at 150□ for 2 hours) to produce a branched thermoplastic polymer which embedded the 3K carbon fiber woven fabric, thereby obtaining a fiber reinforced composite material.

Example 5

(Modifier: Triepoxide; Thermoplastic Polymer: Hyper-Branched)

Bisphenol A epoxy resin (99 g, epoxide equivalent weight: 176-184), benzylamine (29 g), and trimethylolpropane triglycidyl ether (commercially available from KUKDO, 1 g, epoxide equivalent weight: 135-150, modifier) were homogeneously stirred at 30□ to obtain a precursor blend.

Thereafter, the precursor blend was evenly applied onto a 3K carbon fiber woven fabric in a hand lay-up process within 2 hours, and was then evenly pressed using a roller at 100□. The precursor blend was then subjected to in-situ polymerization at a step-wise increasing temperature (i.e., at 80□ for 1 hour and then at 160□ for 2 hours) to produce a branched thermoplastic polymer which embedded the 3K carbon fiber woven fabric, thereby obtaining a fiber reinforced composite material.

Example 6

(Modifier: Triepoxide; Thermoplastic Polymer: Star-Branched)

Trimethylolpropane triglycidyl ether (commercially available from KUKDO, 2 g, epoxide equivalent weight: 135-150, modifier) and benzylamine (29 g) were homogeneously stirred for 4 hours at 60□, followed by addition of Bisphenol A epoxy resin (98 g, epoxide equivalent weight: 176-184) and homogeneous stirring at 30□ to obtain a precursor blend.

Thereafter, the precursor blend was evenly applied onto a 3K carbon fiber woven fabric in a hand lay-up process within 2 hours, and was then evenly pressed using a roller at 50□. The precursor blend was then subjected to in-situ polymerization at a step-wise increasing temperature (i.e., at 50☐ for 1 hour followed by at 100☐ for 1 hour, and then at 150☐ for 2 hours) to produce a branched theimoplastic polymer which embedded the 3K carbon fiber woven fabric, there by obtaining a fiber reinforced composite material.

Example 7

(Modifier: Trifunctional Primary Amine; Thermoplastic Polymer: Hyper-Branched)

Bisphenol F epoxy resin (100 g, epoxide equivalent weight: 160-180), piperazine (24.39 g), and polyetheramine (Huntsman T-403, 0.9 g, modifier) were homogeneously stirred at 60☐ to obtain a precursor blend.

Thereafter, the precursor blend was evenly applied onto a 3K carbon fiber woven fabric in a hand lay-up process within 2 hours, and was then evenly pressed using a roller at 50☐. The precursor blend was then subjected to in-situ polymerization at a step-wise increasing temperature (i.e., at 50☐ for 1 hour followed by at 100☐ for 1 hour, and then at 160☐ for 2 hours) to produce a branched thermoplastic polymer which embedded the 3K carbon fiber woven fabric, thereby obtaining a fiber reinforced composite material.

Example 8

(Modifier: Trifunctional Primary Amine; Thermoplastic Polymer: Star-Branched)

Bisphenol F epoxy resin (100 g, epoxide equivalent weight: 160-180) and polyetheramine (Huntsman T-403, 0.9 g, modifier) were homogeneously stirred for 4 hours at 60☐, followed by addition of piperazine (24.39 g) and homogeneous stirring at 60☐ to obtain a precursor blend.

Thereafter, the precursor blend was evenly applied onto a 3K carbon fiber woven fabric in a hand lay-up process within 2 hours, and was then evenly pressed using a roller at 50☐. The precursor blend was then subjected to in-situ polymerization at a step-wise increasing temperature (i.e., at 50☐ for 1 hour followed by at 100☐ for 1 hour, and then at 160☐ for 2 hours) to produce a branched thermoplastic polymer which embedded the 3K carbon fiber woven fabric, thereby obtaining a fiber reinforced composite material.

Example 9

(Modifier: Tetraepoxide; Thermoplastic Polymer: Hyper-Branched)

Bisphenol F epoxy resin (99 g, epoxide equivalent weight: 160-180), piperazine (25.29 g), and 4,4'-methylenebis(N,N-diglycidylaniline (Huntsman XB 9721, 1 g, modifier) were homogeneously stirred at 60☐ to obtain a precursor blend.

Thereafter, the precursor blend was evenly applied onto a 3K carbon fiber woven fabric in a hand lay-up process within 2 hours, and was then evenly pressed using a roller at 50☐. The precursor blend was then subjected to in-situ polymerization at a step-wise increasing temperature (i.e., at 100☐ for 1 hour followed by at 160☐ for 2 hours) to produce a branched thermoplastic polymer which embedded the 3K carbon fiber woven fabric, thereby obtaining a fiber reinforced composite material.

Example 10

(Modifier: Tetraepoxide; Thermoplastic Polymer: Star-Branched)

4,4'-methylenebis(N,N-diglycidylaniline (Huntsman XB 9721, 1 g, modifier) and piperazine (25.29 g) were homogeneously stirred for 4 hours at 60☐, followed by addition of Bisphenol F epoxy resin (99 g, epoxide equivalent weight: 160-180) and homogeneous stirring at 60☐ to obtain a precursor blend.

Thereafter, the precursor blend was evenly applied onto a 3K carbon fiber woven fabric in a hand lay-up process within 2 hours, and was then evenly pressed using a roller at 50☐. The precursor blend was then subjected to in-situ polymerization at a step-wise increasing temperature (i.e., at 50☐ for 1 hour followed by at 100☐ for 1 hour, and then at 160☐ for 2 hours) to produce a branched thermoplastic polymer which embedded the 3K is carbon fiber woven fabric, thereby obtaining a fiber reinforced composite material.

Example 11

(Modifier: Crystallization Adjutant)

Bisphenol A epoxy resin (DGEBA, 100 g, epoxide equivalent weight: 176-184), benzylamine (26 g), and Jeffamine M-1000 (a crystallization adjutant, 26 g) were homogeneously stirred to obtain a precursor blend.

Thereafter, the precursor blend was evenly applied onto a 3K carbon fiber woven fabric in a hand lay-up process within 2 hours, and was then evenly pressed using a roller at 50☐. The precursor blend was then subjected to in-situ polymerization at a step-wise increasing temperature (i.e., at 50☐ for 1 hour followed by at 100☐ for 1 hour, and then 150☐ for 2 hours), followed by cooling at a cooling rate of 0.5☐.min to produce a thermoplastic polymer which embedded the 3K carbon fiber woven fabric, thereby obtaining a fiber reinforced composite material. The thermoplastic polymer was formed with a partially crystalline phase.

Example 12

(Modifier: Thermoplastic Oligomer)

Bisphenol A epoxy resin (DGEBA, 100 g, epoxide equivalent weight: 176-184) and benzylamine (29 g) were homogeneously stirred, and were then subjected to a curing reaction at a step-wise increasing temperature (i.e., at 50☐ for 1 hour followed by at 100☐ for 1 hour, and then 150☐ for 2 hours) to prepare a cured resin, which was milled to obtain cured resin powders.

Bisphenol A epoxy resin (DGEBA, 95 g, epoxide equivalent weight: 176-184), benzylamine (27.1 g), and the cured resin powders were homogeneously stirred to obtain a precursor blend.

Thereafter, the precursor blend was evenly applied onto a 3K carbon fiber woven fabric in a hand lay-up process within 2 hours, and was then evenly pressed using a roller at 50☐. The precursor blend was then subjected to in-situ polymerization at a step-wise increasing temperature (i.e., at 100☐ for 1 hour and then 150☐ for 2 hours) to produce a thermoplastic polymer which embedded the 3K carbon fiber woven fabric, thereby obtaining a fiber reinforced composite material.

Comparative Example 1

(Modifier: Not added; Thermoplastic Polymer: Linear)

Bisphenol A epoxy resin (100 g, epoxide equivalent weight: 176-184) and benzylamine (29 g) were homogeneously stirred at 30☐ to obtain a precursor blend.

Thereafter, the precursor blend was evenly applied onto a 3K carbon fiber woven fabric in a hand lay-up process within 2 hours, and was then evenly pressed using a roller at 50°C. The precursor blend was then subjected to in-situ polymerization at a step-wise increasing temperature (i.e., at 50°C for 1 hour followed by at 100°C for 1 hour, and then at 150°C for 2 hours) to produce a linear thermoplastic polymer which embedded the 3K carbon fiber woven fabric, thereby obtaining a fiber reinforced composite material.

The amounts of the amine compounds, the types of modifiers used, the amounts of the modifiers, and the structures of the thermoplastic polymers prepared in Examples 1-12 and Comparative Example 1 are set out in Table 1.

TABLE 1

| | Molar ratios* | | | |
|---|---|---|---|---|
| | Amine Compounds (%) | Modifiers (%) | Types of Modifiers | Thermoplastic Polymers |
| Ex. 1 | 99.5 | 0.5 | Difunctional primary amine | Hyper-branched |
| Ex. 2 | 99 | 1 | Difunctional primary amine | Star-branched |
| Ex. 3 | 99.5 | 0.5 | Trifunctional primary amine | Hyper-branched |
| Ex. 4 | 99 | 1 | Trifunctional primary amine | Star-branched |
| Ex. 5 | 102 | 2 | Triepoxide | Hyper-branched |
| Ex. 6 | 103 | 3 | Triepoxide | Star-branched |
| Ex. 7 | 96 | 4 | Trifunctional primary amine | Hyper-branched |
| Ex. 8 | 96 | 4 | Trifunctional primary amine | Star-branched |
| Ex. 9 | 101 | 1 | Tetraepoxide | Hyper-branched |
| Ex. 10 | 101 | 1 | Tetraepoxide | Star-branched |
| Comp. Ex. 1 | 100 | — | — | Linear |

*Based on 100 mole % of diepoxide.

composite materials prepared in Examples 1-12 and Comparative Example 1 was determined using differential scanning calorimetry (DSC) by increasing the temperature of a sample from 25°C to 200°C at a heating rate of 10°C/min. The results are shown in Table 2.

Determination of Tensile Strength:

The tensile strength of each of the thermoplastic polymers contained in the fiber reinforced composite materials prepared in Examples 1-12 and Comparative Example 1 was determined according to ASTM D638 standard test. The results are shown in Table 2.

Determination of Elongation:

The elongation of each of the thermoplastic polymers contained in the fiber reinforced composite materials prepared in Examples 1-12 and Comparative Example 1 was determined according to ASTM D638 standard test. The results are shown in Table 2.

Determination of Flexural Strength:

The flexural strength of each of the thermoplastic polymers contained in the fiber reinforced composite materials prepared in Examples 1-12 and Comparative Example 1 was determined according to ASTM D790 standard test. The results are shown in Table 2.

Determination of Thermal Forming Property:

The thermal forming property of each of the thermoplastic polymers contained in the fiber reinforced composite materials prepared in Examples 1-12 and Comparative Example 1 was determined according to ASTM D1238 standard test. The results are shown in Table 2.

TABLE 2

| | Types of Modifiers | Mw | Tg (°C) | Tensile strength (MPa) | Elongation (%) | Flexural stength (MPa) | Thermal forming |
|---|---|---|---|---|---|---|---|
| Ex. 1 | Difunctional primary amine | ~30,000 | 70 | 69 | 5~10 | 111 | ○ |
| Ex. 2 | Difunctional primary amine | ~35,000 | 71 | 68 | 5~10 | 112 | ○ |
| Ex. 3 | Trifunctional primary amine | ~25,000 | 67 | 67 | 5~15 | 112 | ○ |
| Ex. 4 | Trifunctional primary amine | ~28,000 | 69 | 70 | 5~15 | 109 | ○ |
| Ex. 5 | Triepoxide | ~27,000 | 72 | 68 | 5~10 | 112 | ○ |
| Ex. 6 | Triepoxide | ~30,000 | 73 | 68 | 5~10 | 113 | ○ |
| Ex. 7 | Trifunctional primary amine | ~24,000 | 94 | 70 | 5~15 | 113 | ○ |
| Ex. 8 | Trifunctional primary amine | ~27,000 | 94 | 69 | 5~15 | 111 | ○ |
| Ex. 9 | Tetraepoxide | ~24,000 | 96 | 71 | 5~15 | 115 | ○ |
| Ex. 10 | Tetraepoxide | ~26,000 | 97 | 71 | 5~15 | 113 | ○ |
| Comp. Ex. 1 | — | ~35,000 | 63 | 59 | 3~5 | 99 | ○ |

Determination of Weight Average Molecular Weight (Mw):

The weight average molecular weight (Mw) of each of the thermoplastic polymers contained in the fiber reinforced composite materials prepared in Examples 1-12 and Comparative Example 1 was determined using gel permeation chromatography (GPC). The results are shown in Table 2.

Determination of Glass Transition Temperature (Tg):

The glass transition temperature (Tg) of each of the thermoplastic polymers contained in the fiber reinforced As shown in Table 2, compared to Comparative Example 1 in which the thermoplastic polymer contained in the fiber reinforced composite material has a linear structure, the thermoplastic polymers contained in the fiber reinforced composite materials prepared using the modifiers of the disclosure in Examples 1-10 have branched structures, and thus have relatively high glass transition temperatures and enhanced mechanical properties in terms of tensile strength, elongation, and flexural strength, while maintaining their thermal forming property.

In the present disclosure, the thermoplastic polymer contained in the fiber reinforced composite material is high-performance structural materials that are commonly used in applications requiring resistance to aggressive environments, high strength, and/or low weight. The fiber reinforced composite material comprises layers of fibers that are bonded together with a matrix material, such as a polymer resin. Numerous processes have been developed for the manufacture of the thermoplastic polymer contained in the fiber reinforced composite material. Examples may include wet layup, prepregging, infusion, pultrusion, and resin transfer molding (RTM), etc. While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A precursor blend for preparing a thermoplastic polymer for a fiber-reinforced composite material, comprising:
   a stoichiometric mixture of a diepoxide and an amine compound selected from the group consisting of mono-functional primary amine and difunctional secondary amine, and
   a modifier selected from tetraepoxide wherein
   based on 100 parts by mole of the diepoxide, a content of the amine is 96 parts by mole to 103 parts by mole, and a content of the modifier is 0.5 parts by mole to 1 part by mole, and
   said tetraepoxide is an epoxy resin represented by

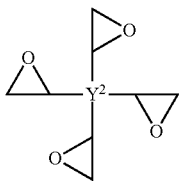

wherein $Y^2$ is

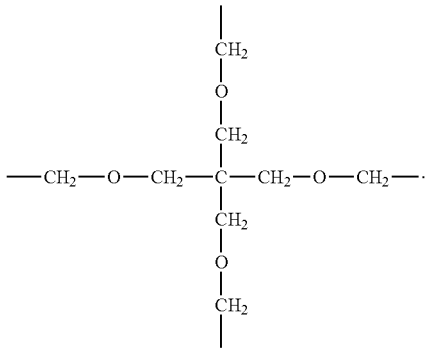 [SMILES: CCOCC(COCC)(COCC)COCC]

2. A fiber reinforced composite material, comprising:
   a fibrous matrix, and
   a thermoplastic polymer obtained by in-situ polymerization of the precursor blend according to claim 1 at said fibrous matrix, said thermoplastic polymer embedding said fibrous matrix.

3. The fiber reinforced composite according to claim 2, wherein said thermoplastic polymer has a weight average molecular weight ranging from 10,000 to 100,000.

4. A method for preparing a fiber-reinforced composite material, comprising the steps of:
   applying the precursor blend according to claim 1 onto a fiber matrix, and
   subjecting the precursor blend to in-situ polymerization to form a thermoplastic polymer.

5. The method according to claim 4, wherein the precursor blend is obtained by simultaneously mixing the diepoxide, the amine compound, and the modifier.

* * * * *